United States Patent [19]
Azima et al.

[11] Patent Number: 6,003,766
[45] Date of Patent: Dec. 21, 1999

[54] VENDING MACHINE

[75] Inventors: Henry Azima, Cambridge; Martin Colloms, London; Neil Harris, Great Shelford, all of United Kingdom

[73] Assignee: New Transducers Limited, London, United Kingdom

[21] Appl. No.: 09/011,833

[22] PCT Filed: Sep. 2, 1996

[86] PCT No.: PCT/GB96/02159

§ 371 Date: May 13, 1998

§ 102(e) Date: May 13, 1998

[87] PCT Pub. No.: WO97/09698

PCT Pub. Date: Mar. 13, 1997

Related U.S. Application Data

[63] Continuation-in-part of application No. 08/707,012, Sep. 3, 1996.

[30] Foreign Application Priority Data

Sep. 2, 1995 [GB] United Kingdom .................. 9517918
Oct. 31, 1995 [GB] United Kingdom .................. 9522281
Mar. 30, 1996 [GB] United Kingdom .................. 9606836

[51] Int. Cl.$^6$ ........................................... G06K 5/00
[52] U.S. Cl. ........................................ 235/379; 235/381
[58] Field of Search .................................... 235/381, 380, 235/382, 492, 379, 375

[56] References Cited

U.S. PATENT DOCUMENTS

| | | | |
|---|---|---|---|
| 5,091,713 | 2/1992 | Horne et al. | 340/541 |
| 5,408,417 | 4/1995 | Wilder | 364/479 |
| 5,445,295 | 8/1995 | Brown | 235/381 |

*Primary Examiner*—Thien Minh Le
*Attorney, Agent, or Firm*—Foley & Lardner

[57] ABSTRACT

A vending machine (108) of the kind comprising a store of articles or products to be dispensed, user operated means (137) for selecting the article or product to be dispensed, means, e.g. a coin freed mechanism authorising dispensing, and a dispensing outlet (142), characterised by a distributed mode acoustic radiator (2) and a transducer (9) mounted wholly and exclusively on the radiator to vibrate the radiator to cause it to resonate.

10 Claims, 5 Drawing Sheets

6,003,766

VENDING MACHINE

DESCRIPTION

This application US International 371 of PCT/GP96/02159 filed Sep. 2, 1996 which is a continuation-in-part of application Ser. No. 08/707,012, filed Sep. 3, 1996.

TECHNICAL FIELD

The invention relates to vending machines.

BACKGROUND ART

It is known from GB-A-2262861 to suggest a panel-form loudspeaker comprising:

a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;

a mounting means which supports the panel or attaches to it a supporting body, in a free undamped manner;

and an electromechanical drive means coupled to the panel which serves to excite a multi-modal resonance in the radiator panel in response to an electrical input within a working frequency band for the loudspeaker.

DISCLOSURE OF INVENTION

Embodiments of the present invention use members of nature, structure and configuration achievable generally and/or specifically by implementing teachings of our copending parent U.S. application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in co-pending application Ser. No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with vending machines incorporating active acoustic devices e.g. in the form of loudspeakers for the purpose of providing information concerning the manner of operation of the machine or its contents. The term "vending machine" is intended to encompass not only food and drink and the like dispensers but also ticket dispensers, automated Bank telling machines, cash dispensers, and the like.

Members as above are herein called distributed mode radiators and are intended to be characterised as in the above copending parent application Ser. No. 08/707,012 and/or otherwise as specifically provided herein.

The invention is a vending machine of the kind comprising a store of articles or product to be dispensed, user operated means for selecting the article or product to be dispensed, means, e.g. a coin freed mechanism authorising dispensing, and a dispensing outlet, characterised by a loudspeaker comprising a distributed mode acoustic radiator and a transducer mounted wholly and exclusively on the radiator to vibrate the radiator to cause it to resonate.

The vending machine may comprise a visual display panel formed by the radiator. The radiator may comprise a stiff lightweight panel having a cellular core sandwiched between a pair of skins, the panel being surrounded by a frame and mounted in the frame by means of a resilient suspension.

The vending machine may comprise a body and the frame may be attached to or formed by the body.

The vending machine may comprise a second transducer coupled to the radiator to produce a signal in response to resonance of the radiator due to incident acoustic energy. Preferably at least two said second transducers are provided, at spaced locations on the radiator.

A further transducer may be provided on the radiator to produce a signal in response to resonance of the radiator to due to incident acoustic energy, and means may be provided for comparing the signal generated by the said further transducer with that of those generated by the said second transducer(s). The comparison means may comprise a signal receiver and conditioner and signal output means.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
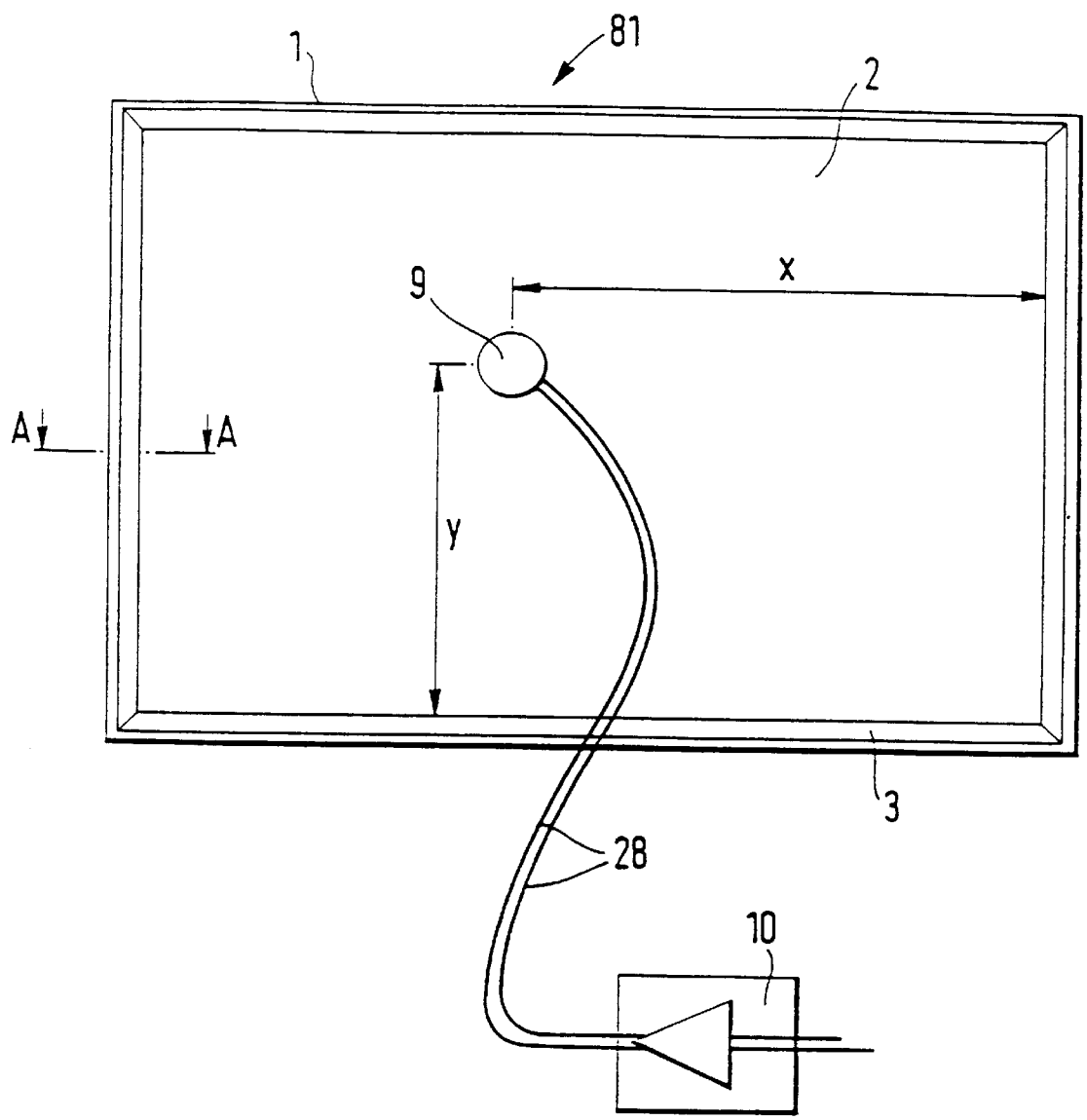
FIG. 1 is a diagram showing a distributed-mode loudspeaker as described and claimed in our co-pending parent application Ser. No. 08/707,012.

Referring to FIG. 1 of the drawings, there is shown a panel-form loudspeaker (81) of the kind described and claimed in our co-pending International application No. (our case P.5711) of even date herewith comprising a rectangular frame (1) carrying a resilient suspension (3) round its inner periphery which supports a distributed mode sound radiating panel (2). A transducer (9) e.g. as described in detail with reference to our co-pending application Ser. Nos. 09/011,773, 09/011,770, and 09/011,831, is mounted wholly and exclusively on or in the panel (2) at a predetermined location defined by dimensions x and y, the position of which location is calculated as described in our co-pending application Ser. No. 08/707,012, to launch bending waves into the panel to cause the panel to resonate to radiate an acoustic output.

The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
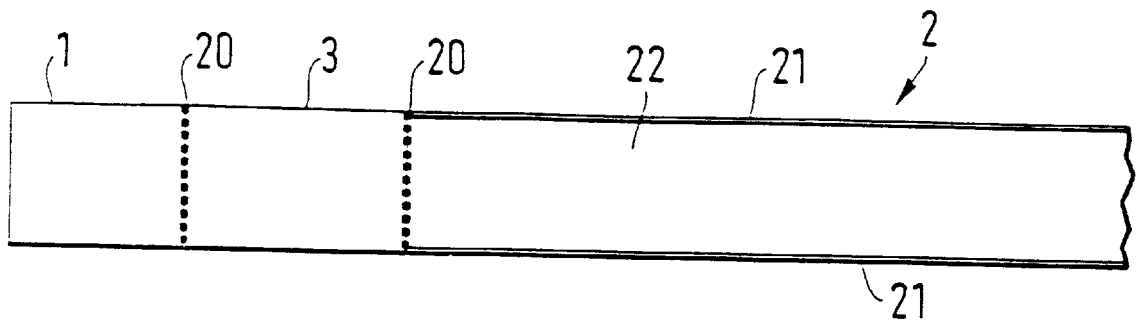
FIG. 2a is a partial section on the line A—A of FIG. 1.
Figure 2B:
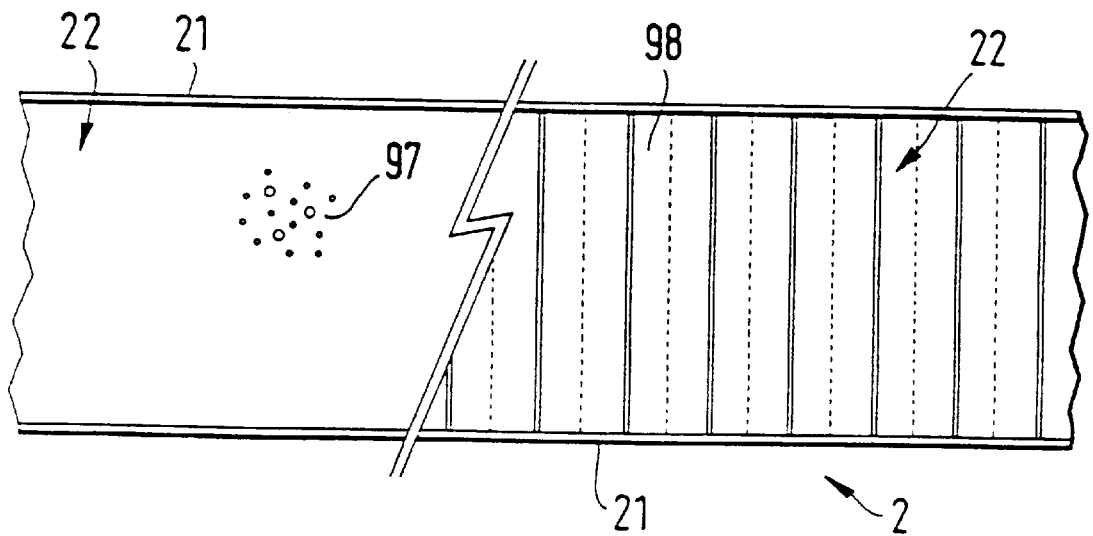
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar (RTM) or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Additionally, such moulding for this and other thermoplastics allows for the mould tooling to carry location and registration features such as grooves or rings for the accurate location of transducer parts e.g. the motor coil, and the magnet suspension. Additional with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Kevlar (RTM), Nomex (RTM), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 metre distant unless specific compensation counter measures are taken.

Where it is important to maintain the screening in an application, electrical connection can be made to the conductive parts of an appropriate DML panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bi-directional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound quality and requiring only one transducer and no crossover for a full range sound from each panel diaphragm.

Figure 3:
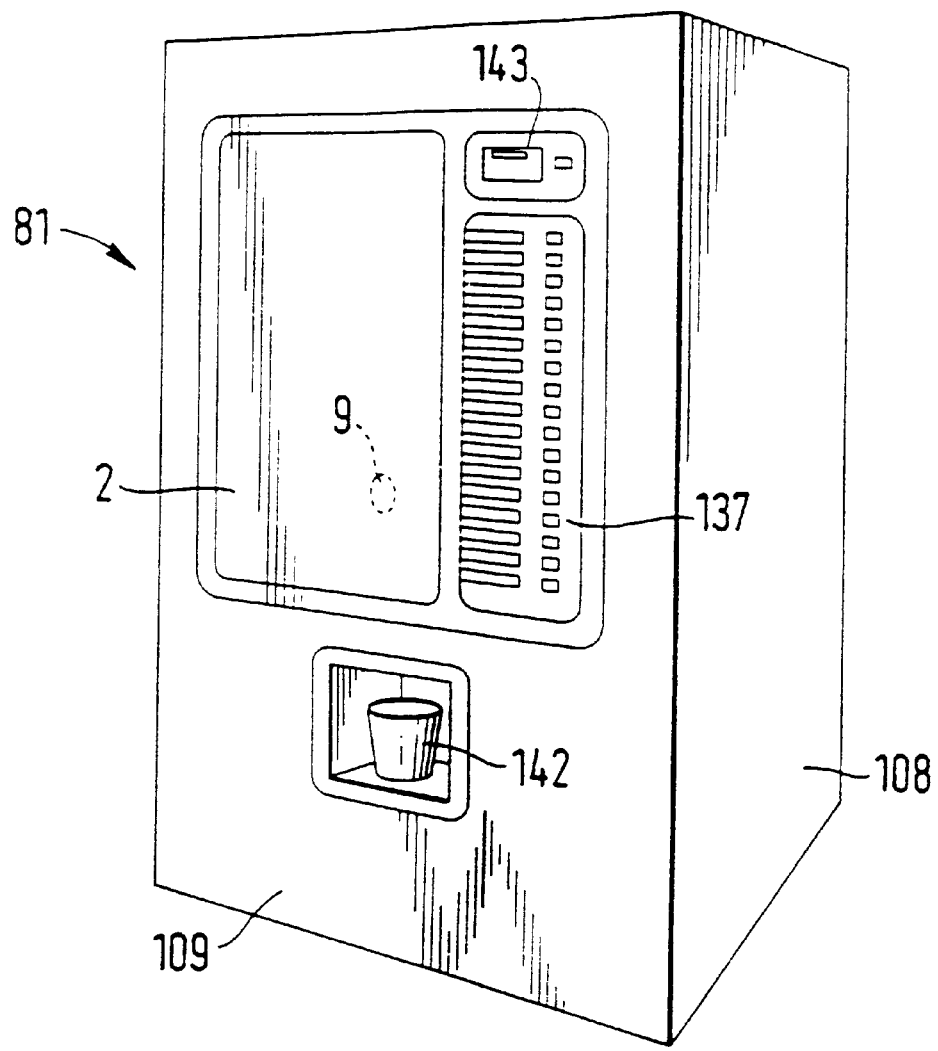
FIG. 3 is a perspective diagram of an embodiment of vending machine according to the present invention.
Figure 4:
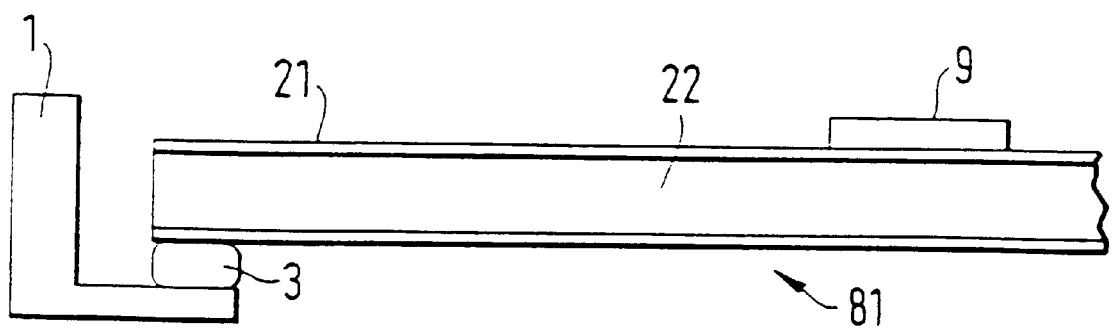
FIG. 4 is a partial cross-sectional view of a detail of the vending machine of FIG. 3.

FIG. 3 illustrates a vending machine (108), e.g. a drinks dispenser incorporating a loudspeaker (81) whereby the loudspeaker forms part of the front face (109) of the vending machine. The loudspeaker (81) is arranged to provide audio information as to the dispensable contents of the machine and/or the manner it is to be operated. The front (109) of the machine carries the normal coin or the like freed mechanism (143), product selector panel (137) and dispenser outlet (142).

The loudspeaker (81) comprises a rectangular lightweight rigid distributed mode radiator panel (2) comprising a cellular core (22) having skin layers (21) on both faces, the panel being supported around its periphery on a resilient suspension (3), e.g. of foam rubber. The suspension is mounted in a rectangular frame (1) mounted in the front face (109) of the machine (108). Thus the loudspeaker is of the kind described in FIGS. 1 and 2. Visual information, e.g. in the form of graphics and text, may be applied to the panel (2) as desired.

The panel (2) carries a transducer (9), e.g. of the kind described with reference to our co-pending International application Nos. (our files P.5683/4/5) of even date herewith, whereby the panel can be vibrated to cause it to resonate to produce an acoustic output. The machine will incorporate the required signal generator to produce the necessary messages and amplifier means (not shown) for driving the transducer (9).

Figure 5:
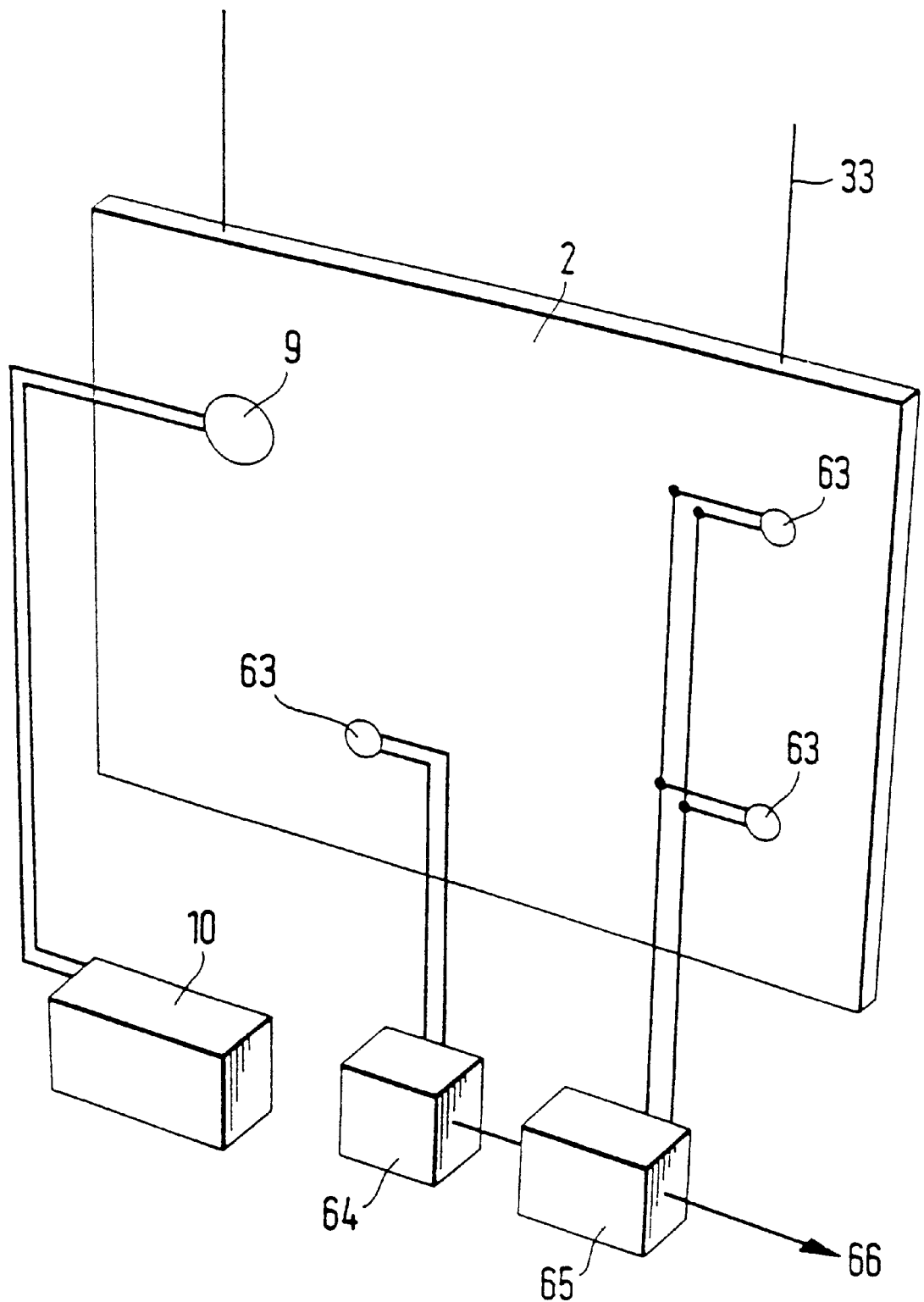
FIG. 5 is a perspective diagram of a modified form of vending machine.

If desired the device can be made to be proactive by arranging that the distributed mode panel (2) is capable of use both as a loudspeaker and as a sound receiver or microphone, as shown in FIG. 5.

The panel is driven to resonate and produce an acoustic output by a transducer (9) of the kind described in our co-pending International application No. of even date herewith, (our files P.5683/4/5), which in turn is connected to and driven by an amplifier (10).

Figure 6:
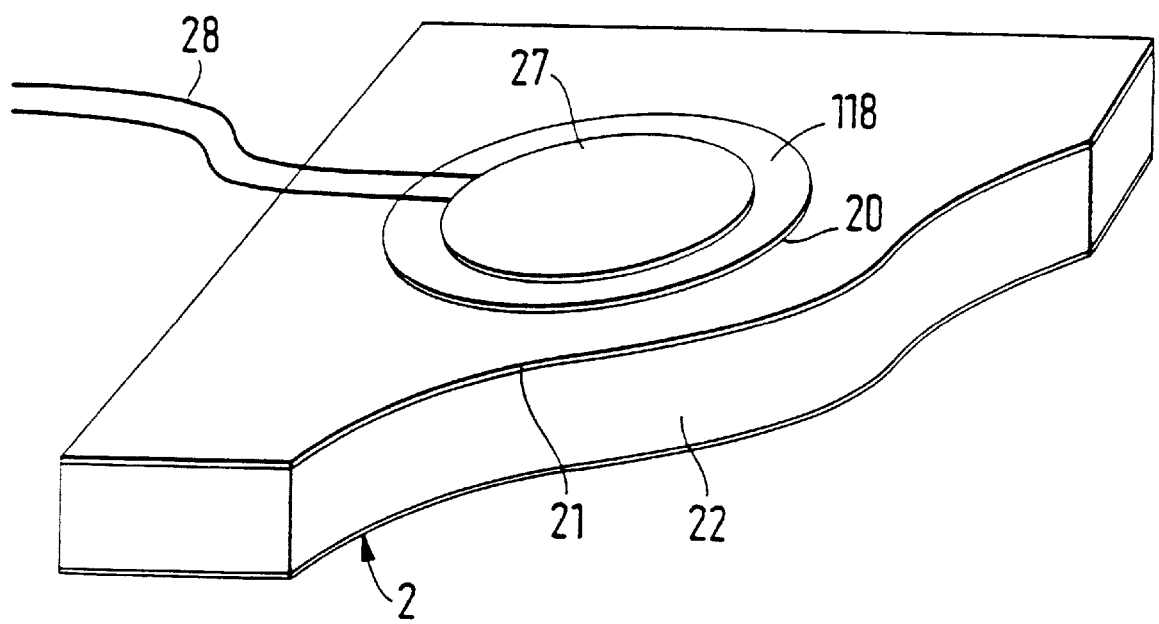
FIG. 6 illustrates one form of transducer.

The panel also carries a pair of vibration transducers (63) which may be piezo-electric transducer of the kind shown in FIG. 6 which are coupled in parallel to drive a signal receiver and conditioner (65) connected to an output (66). Another vibration transducer (63) on the panel (2), e.g. of the kind shown in FIG. 6 is coupled to drive a filter/correlator the output from which is fed to the signal receiver and conditioner (65), to provide signal correction and/or noise cancellation.

FIG. 6 shows a transducer (9) for a distributed mode panel (2) in the form of a crystalline disc-like piezo bender (27) mounted on a disc (118), e.g. of brass, which is bonded to a face of the panel (2), e.g. by an adhesive bond (20). In operation an acoustic signal applied to the transducer (9) via leads (28) will cause the piezo disc (27) to bend and thus locally resiliently deform the panel (2) to launch bending waves into the panel.

Thus the device is configured such that verbal instructions can be given to the vending machine.

We claim:

1. In a vending machine of the kind comprising a store of articles or product to be dispensed, a user operated interface for selecting the article or product to be dispensed, a dispensing mechanism for authorising dispensing, and a dispensing outlet, the improvement comprising a loudspeaker comprising a distributed mode acoustic radiator and a transducer mounted wholly and exclusively on the radiator to vibrate the radiator to cause it to resonate.

2. A vending machine according to claim 1, wherein the radiator has a visual display area.

3. A vending machine according to claim 1 or claim 2, wherein the radiator comprises a stiff lightweight panel having a cellular core sandwiched between a pair of skins.

4. A vending machine according to claim 3, wherein the panel is surrounded by a frame.

5. A vending machine according to claim 4, further comprising a resilient suspension mounting the panel in the frame.

6. A vending machine according to claim 4 or claim 5, wherein the machine comprises a body, and the frame is on or integral with the body.

7. A vending machine according to claim 1, further comprising at least one additional transducer coupled to the radiator to produce a signal in response to resonance of the radiator due to the incident acoustic energy.

8. A vending machine according to claim 7, comprising at least two said additional transducers, at spaced locations on the radiator.

9. A vending machine according to claim 8, further comprising a further transducer on the radiator to produce a signal in response to resonance of the radiator due to incident acoustic energy, and a signal comparator for comparing the signal generated by the said further transducer with the signals generated by the said second transducer.

10. A vending machine according to claim 9, wherein said signal comparator comprises a signal receiver and conditioner and signal output means.

* * * * *

UNITED STATES PATENT AND TRADEMARK OFFICE
CERTIFICATE OF CORRECTION

PATENT NO.   : 6,003,766
DATED        : December 21, 1999
INVENTOR(S)  : Henry Azima et al.

It is certified that error appears in the above-identified patent and that said Letters Patent is hereby corrected as shown below:

Column 1,
Lines 4-6, delete "This application US International 371 of PCT/GP96/02159 filed Sep. 2, 1996 which is a continuation-in-part of application Ser. No. 08/707,012, filed Sep. 3, 1996." and substitute therefor -- This application is a continuation-in-part of Application No. 08/707,012, filed September 3, 1996. --.

Column 2,
Line 55, delete "International" and substitute therefor -- parent --;
Lines 55-56, delete "(our case P.5711) of even date herewith" and substitute therefor -- 08/707,012 --.

Column 5,
Line 41, delete "International";
Line 42, delete "(our files P.5683/4/5) of even date herewith" and substitute therefor -- 09/011,773, 09/011,770, and 09/011,831 --;
Line 54, delete "International"; and
Lines 54-55, delete "No. of even date herewith, (our files P.5683/4/5)" and substitute therefor -- Nos. 09/011,773, 09/011,770, and 09/011, 831 --.

Signed and Sealed this

Thirtieth Day of April, 2002

Attest:

JAMES E. ROGAN
Attesting Officer
Director of the United States Patent and Trademark Office